United States Patent
Vogelmeier et al.

(10) Patent No.: US 11,972,041 B2
(45) Date of Patent: Apr. 30, 2024

(54) DISPLAY ARRANGEMENT FOR VIDEO WORKSTATION IN A VEHICLE

(71) Applicant: Airbus Defence and Space GmbH, Taufkirchn (DE)

(72) Inventors: Leonhard Vogelmeier, Taufkirchen (DE); Cesar Alvarez Diez, Getafe (ES)

(73) Assignee: Airbus Defence and Space GmbH, Taufkirchen (DE)

( * ) Notice: Subject to any disclaimer, the term of this patent is extended or adjusted under 35 U.S.C. 154(b) by 0 days.

(21) Appl. No.: 18/134,215

(22) Filed: Apr. 13, 2023

(65) Prior Publication Data
US 2023/0333636 A1    Oct. 19, 2023

(30) Foreign Application Priority Data
Apr. 14, 2022    (EP) .................................... 22382356

(51) Int. Cl.
*G06F 3/01*    (2006.01)
*G02B 27/01*    (2006.01)
*G09G 3/00*    (2006.01)

(52) U.S. Cl.
CPC ........... *G06F 3/012* (2013.01); *G02B 27/017* (2013.01); *G09G 3/003* (2013.01);
(Continued)

(58) Field of Classification Search
CPC .............. G02B 27/017; G02B 27/0093; G02B 27/0172; G02B 27/172; G02B 2027/0178; G06T 7/248; G06T 2207/30268; G06T 2207/30244; G06T 3/60; G06F 3/0346; G06F 3/012
See application file for complete search history.

(56) References Cited

U.S. PATENT DOCUMENTS 9,459,692 B1 *  10/2016  Li ........................... G06T 7/248
2018/0081426 A1 *  3/2018  Rothkopf ................ G06F 3/012
(Continued)

FOREIGN PATENT DOCUMENTS

NO    2017172984 A2    10/2017

OTHER PUBLICATIONS

1 European Search Report for U.S. Appl. No. 22/382,356 dated Sep. 9, 2022.

*Primary Examiner* — Xuemei Zheng
(74) *Attorney, Agent, or Firm* — KDW Firm PLLC

(57) ABSTRACT

A display arrangement for presenting video information to a human operator in a vehicle senses vehicle movements and movements of a head mounted display unit. Based on vehicle movements and movements of the display unit, a virtual scenario with background video data and application video data are generated to a display arrangement. The background video data are modified so background video moves opposite to vehicle movements. The application video data are modified so application video moves according to vehicle movement. A perspective onto the application video can be modified based on relative movements of the display unit with respect to the vehicle. This may reduce conflicts between sensory impressions of the vestibular system and eyes of the operator because movements of the vehicle and movements of the display unit are considered when generating and modifying the background and application video data presented to the operator.

14 Claims, 3 Drawing Sheets

(52) U.S. Cl.
    CPC ............... *G09G 2320/0261* (2013.01); *G09G
             2320/068* (2013.01); *G09G 2340/10* (2013.01);
                   *G09G 2340/12* (2013.01); *G09G 2354/00*
                        (2013.01); *G09G 2380/12* (2013.01)

(56)　　　　　　References Cited

U.S. PATENT DOCUMENTS

| | | |
|---|---|---|
| 2018/0365804 A1 | 12/2018 | Rikoski |
| 2021/0381836 A1* | 12/2021 | Price .................. G06F 3/011 |
| 2023/0215023 A1* | 7/2023 | Raghoebardajal ...... G06T 7/254 |

* cited by examiner

DISPLAY ARRANGEMENT FOR VIDEO WORKSTATION IN A VEHICLE

TECHNICAL FIELD

The disclosure herein relates to a display arrangement for presenting a virtual video scenario to a human operator in a vehicle, and to a vehicle with such a display arrangement. The display arrangement may be part of a video workstation of an operator and may be located within an aircraft or any other movable vehicle.

BACKGROUND

Video workstations for human operators become more and more relevant in modern working environments. Such workstations present video data to the operator and receive input commands from the operator to carry out certain actions. For example, a video workstation may present information to the operator and receive commands for machines that interact with the environment.

Such video workstations can be used to remotely command machines, industrial plants, military devices, or other devices without the need for an operator to be physically where the commanded devices are.

However, working on a video workstation may be exhausting for a human operator because the impressions perceived by the human sense organs may be conflicting. Especially when the workstation is located in a moving vehicle, there may be a conflict between the impressions perceived by the vestibular system and the impressions perceived by the visual system of the human operator. For example, when the vehicle moves and changes its directions of movement, the vestibular system perceives those changes while the visual system does not necessarily provide corresponding information. This especially applies when the visual system of the operator is decoupled from the real world outside the moving vehicle. Different perceptions of an operator regarding the own movement relative to the world by the visual system and the vestibular system may cause sickness to the operator. Such sickness may be called cyber sickness or virtual reality sickness.

SUMMARY

It may be seen as an object to provide a display arrangement for a workstation that reduces the risk of cyber sickness when working on that workstation in a movable platform. This object is solved by the subject matter disclosed herein.

A display arrangement and a vehicle are disclosed herein. Further developments can be derived from the following description.

According to an aspect, a display arrangement for presenting a virtual video scenario to a human operator in a vehicle is provided. The display arrangement comprises a display unit with a housing, a first sensor, and a retaining strap. The display unit is configured to be releasably attached to a head of the human operator, and the first sensor is configured to sense first spatial movement information of the display unit. The display arrangement further comprises a second sensor that is couplable to the vehicle and configured to sense second spatial movement information of the vehicle. The display arrangement further comprises a control unit that is communicatively coupled to the display unit and configured to provide a virtual video scenario to be displayed by the display unit, and to receive the first spatial movement information. The control unit is communicatively coupled to the second sensor and configured to receive the second spatial movement information. The control unit is configured to generate the virtual video scenario based on background video data and application video data. The control unit is further configured to determine a relative movement of the display unit with regard to the vehicle based on the second spatial movement information and the first spatial movement information. The control unit is further configured to modify the background video data based on the second spatial movement information, and to modify the application video data based on the second spatial movement information and the relative movement of the display unit with regard to the vehicle.

For example, the display arrangement described herein may be used for a virtual reality based workplace in vehicle like aircraft, land vehicle, watercraft, submarine vessels, or any other movable platforms. Such a workplace may be a workplace inside a search and rescue aircraft or a full immersive helmet mounted display inside an aircraft cockpit.

When different perceptions regarding the own movement of a human operator relative to the real world are provided by the visual and vestibular systems, this may cause cyber sickness to a human operator. As video material presented to the human operator and perceived by the visual system is in almost all cases not related to the movement of the vehicle in which the operator is located and, thus, contradicts the perceptions of the vestibular system, watching video data inside a moving vehicle may cause cyber sickness.

The risk of cyber sickness is reduced by the display arrangement described herein because it combines the presentation of video material (application video data which are required to be presented to the operator) with the presentation of visual cues (background video data) representing the vehicle's movement in the real world. This approach may mitigate the effects that cause cyber sickness because the operator is presented background video data that is coupled to the vehicle movement and presents visual information to the operator which correspond to the impressions perceived by the vestibular system.

For example, the virtual video scenario is presented to the operator in such a way that even when the operator focuses on the application video data, there are still enough visual cues in the peripheral view of the operator representing the vehicle movement to keep the stimuli of the vestibular system and the visual system in line.

The control unit generates and provides the background video data in such a manner that the background video data is coupled to the second spatial movement (movement of the vehicle). It appears to the operator as if the background video data is a static background and the vehicle moves with respect to the static background. For example, the background video data needs to be moved to compensate for the vehicle movement, especially by moving the background video data in the opposite direction to the movement of the vehicle. That is how the vestibular system and the visual system of the operator are held in line with each other and provide corresponding perceptions.

Typically, the background video data does not include any operational data relevant to the working processes of the operator. Instead, the background video data only provides visual cues to the operator so that the visual system perceives sensual impressions that correspond to the impressions of the vestibular system. For example, the background video data represents a virtual scenery like a sphere with a diameter much larger than the operator to create an artificial horizon.

The background video data may include objects located at regular or irregular distances to each other and being shaped same or different with same or different sizes. Preferably, the background video data includes objects that are static on the artificial horizon, i.e., there is preferably no relative movement between the objects of the artificial horizon, and the objects in the background video data only move when the vehicle performs a rotational movement about one of the spatial axes. Preferably, linear movements of the vehicle along one of the spatial axes are not reflected by the background video data, i.e., the objects of the background video data do not come closer or move away from the position of the operator's eye during linear movement of the vehicle. Such linear movement may not be required to be represented by the background video data because linear movement may not have any impact on cyber sickness.

The purpose of the background video data is to provide a visual environment to the operator so that actual movements of the vehicle are represented by movements of the background video data to avoid differences between vestibular and visual perceptions. The center of the sphere is bound to the operator's eyes. The sphere may include a polar grid to provide appropriate visual cues to the operator. The sphere gives the operator the necessary visual impression about the movement of the operator inside the real world and is in line with the impression of the vestibular system.

The application video data includes the video data that are presented to the operator for carrying out the operator's tasks. Application video data can be any data that is required by the operator to perform an assigned task. The application video data is embedded or overlays the background video data. However, the application video data does not entirely overlay the background video data. Rather, the application video data takes only a part of the operator's field of view while the peripheral area of the field of view of the operator still includes visual information of the background video data.

In contrast to the background video data (which are moved opposite to the vehicle's movement), the application video data are moved in the same direction as the vehicle. Thus, the operator also gets the visual impression of the vehicle's movement with regard to the background. When the vehicle moves, the background video data are modified to move opposite to the vehicle's movement and the application video data are modified to move with the vehicle's movement. Thus, when the vehicle moves, the vestibular system perceives that movement automatically per its inherent functioning, and the visual system of the operator perceives that movement because the application video data are modified to move with respect to the background video data.

Additionally, the application video data is modified based on the relative movement of the display unit with regard to the vehicle. Thus, when the operator moves his/her head and changes the perspective onto the application video data, this movement of the operator's head also results in modifying the perspective onto the application video data.

Generally, when referring to video data in this document, images with moving or movable content are meant. However, the application video data may also relate to static images or images that are static for a limited period of time. The background video data is modified and moved in response to movements of the vehicle. Thus, when the vehicle does not perform any movements, like rotational movements about one or more spatial axes, the background video data is not moved, too. Furthermore, when the application video data show a static image, this static image as such is nevertheless moved with respect to the background video data when the vehicle performs a movement about one or more spatial axes (this means that a static image as such is movable with respect to the background video data although its content is not moving).

To be able to modify the background video data and the application video data, the movement of the vehicle and the movement of the operator's head are sensed by respective sensors.

The first sensor senses the movement of the vehicle. Especially, the first sensor is configured to sense a rotational movement of the vehicle about one, two, or three spatial axes (roll, pitch, yaw), depending on the type of vehicle. For a submarine vessel and an aircraft, the movements about all three spatial axes are preferably sensed. For a land vehicle, sensing the rotational movement about the yaw-axis (left/right-movements) may be sufficient.

The second sensor senses the movement of the operator or of the operator's head, similar to what is described with reference to the first sensor and the vehicle's movement. However, since the operator is located within the vehicle, the second sensor senses the overall movement of the operator or the operator's head, i.e., the movement of the vehicle superimposed with the movement of the operator or the operator's head. Therefore, in order to identify the movement of the operator or the operator's head relative to the vehicle, the movement of the vehicle needs to be eliminated from the movement sensed by the second sensor.

Summing up, the background video data is modified based on the second spatial movement information (movement of the vehicle), the relative movement of the application video data with respect to the background video data is determined based on the second spatial movement information (movement of the vehicle), and the perspective of the operator onto the application video data is determined based on the relative movement of the display unit with regard to the vehicle (movement of the display unit cleared by the movement of the vehicle).

The virtual video scenario is the video presented to the operator by a display of the display unit. The display may be any kind of display that is suitable for being used in head mounted display units. This virtual video scenario is composed of background video data and application video data. The background video data and the application video data refer to the optical signals than can be visually perceived by the operator. The background video data and the application video data are displayed by the display unit and are based on electronic signals that are generated and provided by the control unit. Thus, when saying that the control unit generates and provides the background and application video data to the display unit, this means that the control unit generates any commands and signals which are in a predetermined protocol to instruct the display unit to present visually perceivable information to an operator.

The control unit may be a computer like a general purpose computer with a processor and a graphics unit that generates and outputs video data for the display unit. The control unit may be programmed in a certain manner to carry out the functions described with reference to the control unit and to instruct the display unit to present the virtual video scenario as described herein.

The first and second sensors each may be inertial measuring units which are configured to sense rotational movements about one or more spatial axes. The first sensor may be attached to the display unit or one of its components, preferably to the housing of the display unit, and is configured detect movements of the operator's head. The second sensor may be attached to the vehicle, e.g., to a fuselage of an aircraft or to a frame member of the vehicle, and is configured to detect movements of the vehicle.

In the context of this document, modifying the background video data and/or the application video data may particularly mean that the background and/or application video data are rotated and/or moved on a display presented to an operator to be in line with the movements of the vehicle and/or the head of the operator and/or to compensate any of these movements. In other words, it is not necessarily the content of the background and/or application video data, but typically only the orientation and position of the background and/or application video data that is modified as described herein.

According to an embodiment, the first sensor is configured to sense a rotational movement of the display unit about at least one spatial axis.

The relevant movements and/or movement changes for cyber sickness as referred to in this document are rotational movements because those cause a conflict between the vestibular system and the visual system of a human operator. Thus, the first sensor particularly senses rotational movements of the display unit that is coupled to the operator's head.

According to a further embodiment, the first sensor is configured to sense a rotational movement of the display unit about each of three orthogonal spatial axes.

The first sensor of this embodiment senses movements of the operator's head about all spatial axes and can, therefore, vary the perspective onto the application data in accordance with any movement of the operator's head.

According to a further embodiment, the second sensor is configured to sense a rotational movement of the vehicle about at least one spatial axis.

According to a further embodiment, the second sensor is configured to sense a rotational movement of the vehicle about each of three orthogonal spatial axes.

This embodiment is particularly useful for aircraft and submarine vessel applications because these vehicles are free to perform movements about all three spatial axes.

According to a further embodiment, the background video data represent a spherical artificial horizon that surrounds an eye-point of the operator at a predetermined virtual distance.

According to a further embodiment, the application video data is embedded within the background video data and overlays the background video data when observed by the operator.

According to a further embodiment, the application video data is surrounded by a peripheral region represented by background video data not overlaid by the application video data.

According to a further embodiment, the control unit is configured to determine the relative movement of the display unit with regard to the vehicle by subtracting the second spatial movement information from the first spatial movement information.

According to a further embodiment, the control unit is configured to modify the background video data based on the second spatial movement information in a manner that the background video data perform a movement opposite to the second spatial movement.

This compensates the second spatial movement of the vehicle, and the background video data represent a static artificial horizon with respect to which the vehicle moves when performing the second spatial movement. Thereby, the vestibular system of the human operator and the visual impression of the background video data correspond to each other. For example, when the vehicle rotates clockwise about the yaw-axis at a given angular velocity, the control unit modifies the background video data such that it rotates counterclockwise at the same amount of the angular velocity at which the vehicle rotates clockwise. A similar approach relates to the other two spatial axes (roll- and pitch-axis). When the vehicle performs a certain movement, the background video is concurrently moved in the opposite direction so that the sensory impressions of an operator received from the vestibular systems and the visual impressions of the operator's eyes are congruent. In other words, the control unit generates and modifies the background video data (and the video represented thereby) such that the operator has the visual impression to move with respect to the background video data in correspondence with the actual movement of the vehicle.

According to a further embodiment, the control unit is configured to modify the application video data based on the second spatial movement information in a manner that the application video data perform a movement with respect to the background video data in the same direction as the second spatial movement.

The control unit generates and modifies the application video data such that the application video presented to the operator performs a relative movement to the background video in such a manner that the movement of the application video with respect to the background video corresponds to the second spatial movement (movement of the vehicle). Thus, the operator gets the visual impression that the application video moves in a manner that corresponds to the movement of the vehicle while the background video appears static because it moves opposite to the movement of the vehicle.

This approach allows for resolving possible conflicts between visual impressions and impressions of the vestibular system when a human operator works in a moving vehicle with a head mounted display that isolates the visual impressions from the surroundings.

According to a further embodiment, the control unit is configured to modify the application video data based on the relative movement of the display unit with regard to the vehicle in a manner that the application video data are shown from a different perspective in accordance with the relative movement of the display unit with regard to the vehicle.

Thus, the movement of the display unit with respect to the vehicle in which the operator is located and operates with the display arrangement is used to determine the perspective or viewpoint of the operator onto the application video. For this purpose, the relative movement of the display unit with respect to the vehicle is used because it is this relative movement that is relevant for the perspective onto the application video data.

The background video data are modified so that the background video moves opposite to the vehicle movements. The application video data are modified so that the application video moves with respect to the background video in accordance with the vehicle movement. A perspective onto the application video can be modified based on the relative movements of the display unit with respect to the vehicle. This approach may reduce conflicts between sensory impressions of the vestibular system and the eyes of the operator because the movements of the vehicle as well as the movements of the display unit are considered when generating and modifying the background and application video data presented to the operator.

In some embodiments, the display arrangement comprises a position tracking unit that is arranged and configured to detect position changes of the display unit with respect to a reference object. The position tracking unit may comprise a camera or other sensors that are able to detect the relative position of the display unit with respect to the camera of the other sensors. The position of the display unit is then transmitted to the control unit and the control unit is configured to generate and provide the application video data in additional consideration of the position of the display unit. Thus, when the operator performs a linear movement along one of the spatial axes, the perspective of the operator onto the application video data may be varied in accordance with the position of the display unit. The display unit may include markers that are detected by the position tracking unit in order to determine the position of the display unit.

According to a further aspect, a vehicle is provided that comprises a display arrangement as described above and hereinafter, wherein the display arrangement is part of a video workstation for an operator.

According to an embodiment, the second sensor is fixedly attached to the vehicle.

Thus, the sensor performs the movements of the vehicle, and the control unit is provided with the respective sensor data in order to generate and provide the virtual video scenario as described above with reference to the display arrangement.

For example, the vehicle is an aircraft. The aircraft may include a workplace for an operator who is provided with video data via a head mounted display.

BRIEF DESCRIPTION OF THE DRAWINGS

The subject matter will hereinafter be described in conjunction with the following drawing figures, wherein like numerals denote like elements, and wherein.

DETAILED DESCRIPTION

Figure 1:
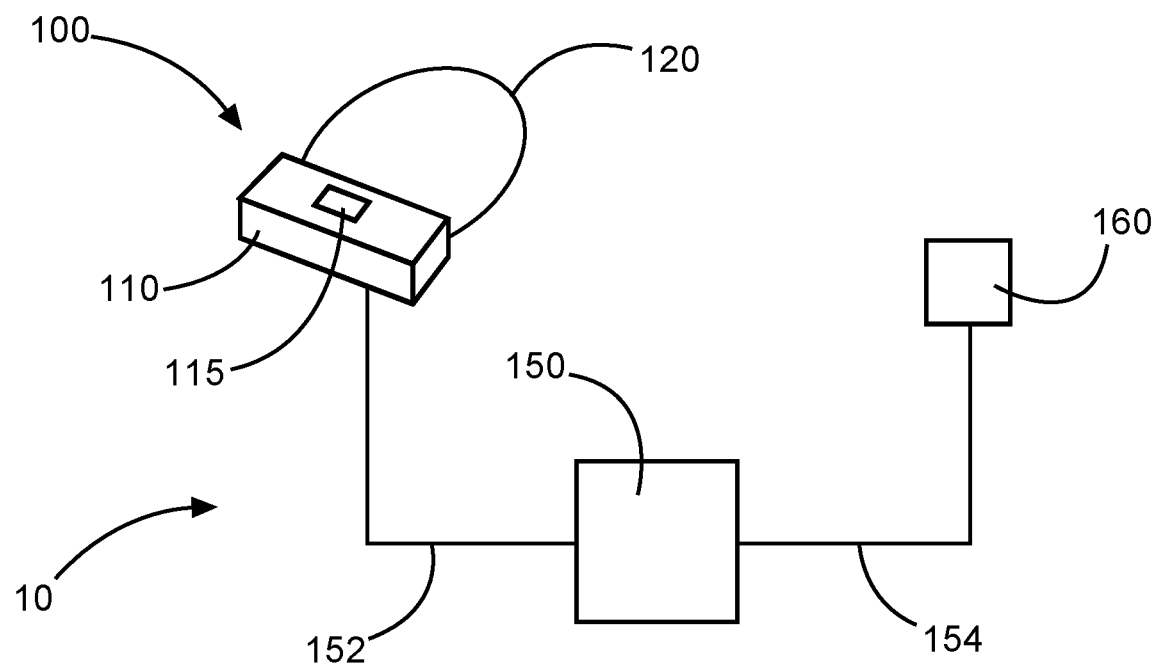
FIG. 1 is a schematic representation of a display arrangement.

The following detailed description is merely exemplary in nature and is not intended to limit the disclosure herein and uses of the disclosure herein. Furthermore, there is no intention to be bound by any theory presented in the preceding background or the following detailed description.

The representations and illustrations in the drawings are schematic and not to scale. Like numerals denote like elements.

A greater understanding of the described subject matter may be obtained through a review of the illustrations together with a review of the detailed description that follows.

FIG. 1 shows a display arrangement 10 with a display unit 100, a control unit 150, and a second sensor 160. The display unit 100 comprises a housing 110, a first sensor 115 mounted to the housing 110, and a retaining strap 120 attached to the housing 110 and configured to hold the display unit 100 relative to a head of a human operator in front of the operator's eyes so that the operator can visually perceive a virtual video scenario displayed by the display unit 100.

The control unit 150 is communicatively connected to the display unit 100 via a first data exchange connection 152, and to the second sensor 160 via a second data exchange connection 154. The first and second data exchange connections 152, 154 may be wireless or wired connections. The control unit 150 provides the video scenario to the display unit 110 for being presented to the operator and receives measurement data sensed by the first sensor 115 relating to rotational movements of the display unit 100 and/or of its housing 110. The control unit 150 furthermore receives measurement data sensed by the second sensor 160 relating to rotational movements of the vehicle to which the second sensor 160 is attached.

Based on the data received from the first and second sensors 115, 160, the control unit 115 generates and provides the video scenario with the background video data and the application video data presented by the display unit 100.

Figure 2:
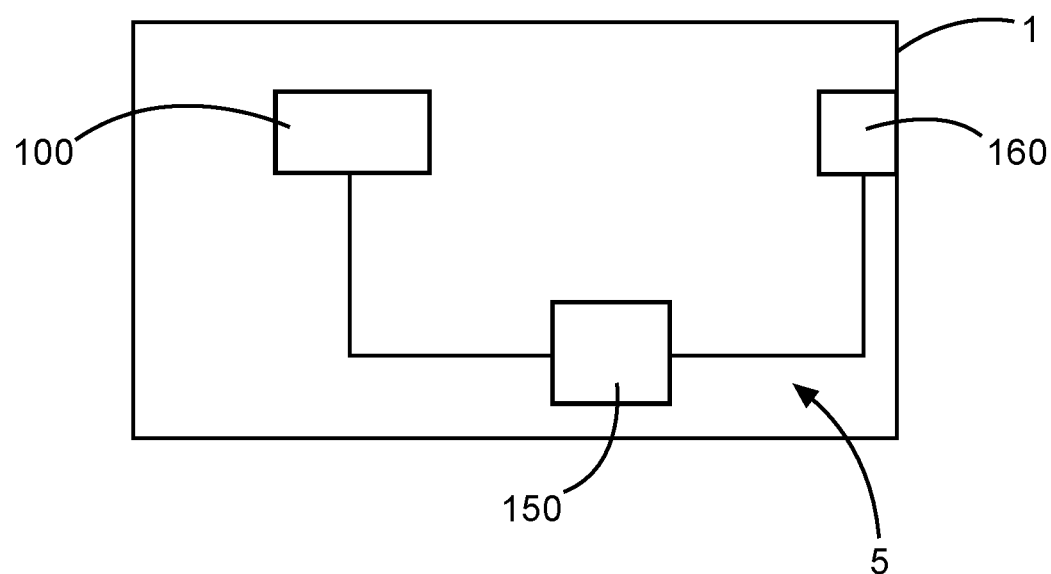
FIG. 2 is a schematic representation of a vehicle with a display arrangement.

FIG. 2 shows a vehicle 1 with a video workstation 5 that comprises the components of the display arrangement described with reference to FIG. 1. The video workstation 5 comprises the display unit 100, the control unit 150, and the second sensor 160, which is attached to the vehicle 1.

It is noted that the workstation 5 may also include input elements like any known input devices for interacting with a computer, e.g., a keyboard, a mouse, touch-sensitive screens, data gloves, etc. The input elements are not shown in FIG. 2 for the sake of simplicity. The input elements receive input commands from the operator. The control unit 150 performs actions based on the input commands.

Figure 3:
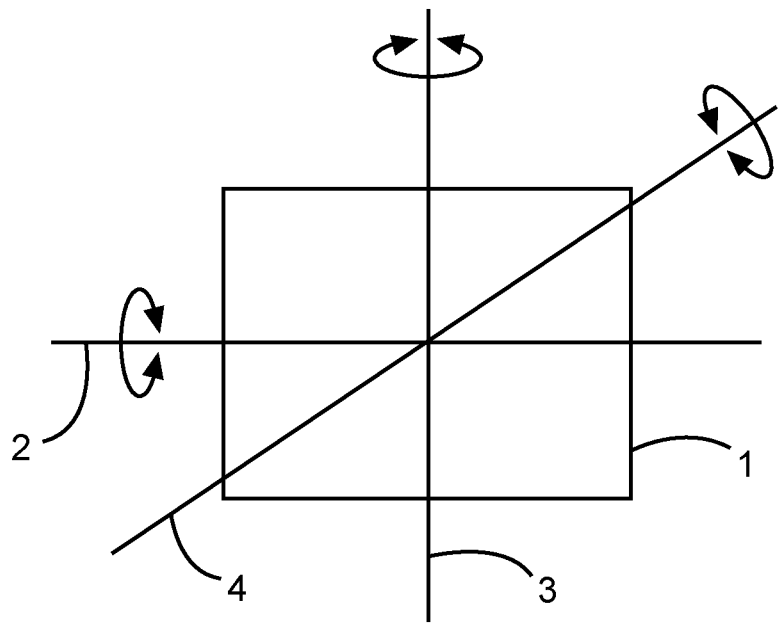
FIG. 3 is a schematic representation of a vehicle that performs rotational movements about three spatial axes.

FIG. 3 schematically shows a vehicle 1 and possible rotational movements about the roll-axis 2, and/or the yaw-axis 3, and/or the pitch-axis 4. These rotational movements are the cause for sensory impressions perceived by the vestibular system of an operator located in a vehicle. However, when the visual perceptions do not correspond to the vestibular impressions, this may cause cyber sickness. When the operator wears a head mounted display and is visually decoupled from the environment, the risk for cyber sickness may be high.

To reduce the risk of cyber sickness, the operator is provided with video data that bring the visual impressions in line with the vestibular impressions, as described with reference to the following figures.

Figure 4:
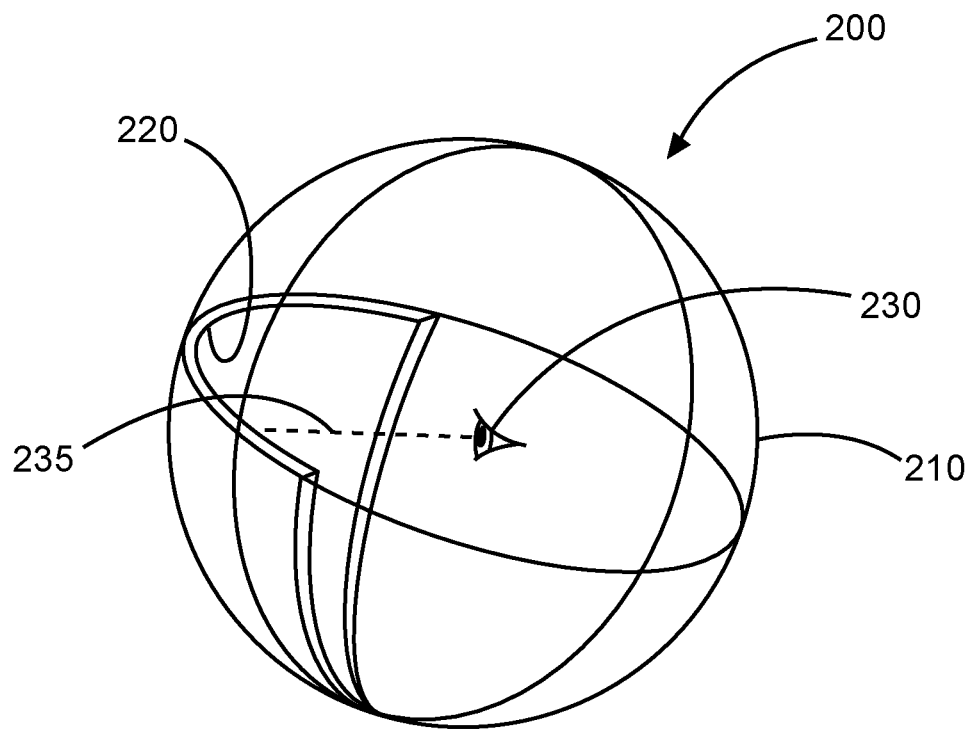
FIG. 4 is a schematic representation of a virtual video scenario with background video data and application video data.

FIG. 4 schematically shows a virtual video scenario 200 which is composed of background video data 210, application video data 220, and an eye-point 230 of an operator. The virtual video scenario 200 is generated by the control unit 150 (see FIGS. 1 and 2) so that the background video data 210 has a certain distance to the eye-point 230. For example, the background video data corresponds to an artificial horizon shaped like a sphere with the radius 235 with the eye-point 230 in the center of that virtual sphere. When the perspective of the operator is varied within the sphere, the artificial horizon is spaced apart the same distance from the eye-point 230. The background video data 210 serves as a frame for the visual system of the operator within which the physical movements of the vehicle are mapped to bring and/or keep the impressions of the visual and vestibular system in line.

The video scenario 200 additionally includes a region with application video data 220 which form only a part of the field of view of the operator. Thus, the application video data do not cover the entire background video data visible to the operator. For example, the application video data span over a spatial angle of about 60° while the remainder of the field of view of the operator is background video data. Thus, the peripheral field of view of the operator visually presents background video data to the operator.

The display arrangement 10 can provide information about the movement of the aircraft (by the second sensor 160) and about the movement of the display unit 100 (by the first sensor 115). The control unit 150 is able to determine the movement of the display unit 100 relative to the aircraft based on the measurement data of both sensors 115, 160.

As shown in FIG. 4, the display arrangement 10 provides two different types of visual stimuli to the operator.

The first one, referred to above as background video data, is realized as a sphere, called real world sphere in the following and indicated by reference sign 210, with a diameter or radius 235 much larger than the operator, wherein the sphere surrounds the operator, indicated by eye-point 230. The center of the sphere 210 is bound to the position of the operator's eyes, so that the operator's eyes are always in the center of the sphere. The sphere represents in its easiest realization an artificial horizon with a polar grid and its orientation is coupled to the vehicle's movement in a way that compensates the vehicle's movement by moving the sphere opposite to the vehicle's movement, so that the sphere seems to be steady to the operator like the operator would expect it from the real world. This sphere gives the operator the necessary visual stimuli about the own movement inside the real world which is also in line with his vestibular stimuli.

For the presentation of the video data, referred to above as application video data, an adaptable part of a smaller sphere called spherical display segment in the following and indicated by reference sign 220, which is concentric to the real world sphere 210 is used. This spherical display segment 220 can in general be of any size and be placed at any direction regarding the normal viewing direction of the operator with the following restriction. The spherical display segment 220 is typically steady to the vehicle as well in position as also in size like a real display inside a vehicle. The spherical display segment 220 may be resized and repositioned manually by the operator. Thus, the spherical display segment 220 may serve beside others as visual cue for the movement of the operator relevant to the vehicle. For the case that the spherical display segment 220 would cover too much of the field of view of the operator, an algorithm clips the spherical display segment to a size that enough visual stimuli from the real world sphere 210 are visible in the peripheral view of the operator. The same algorithms may also add vehicle steady geometry, if too less of the spherical display segment is visible.

Figure 5:
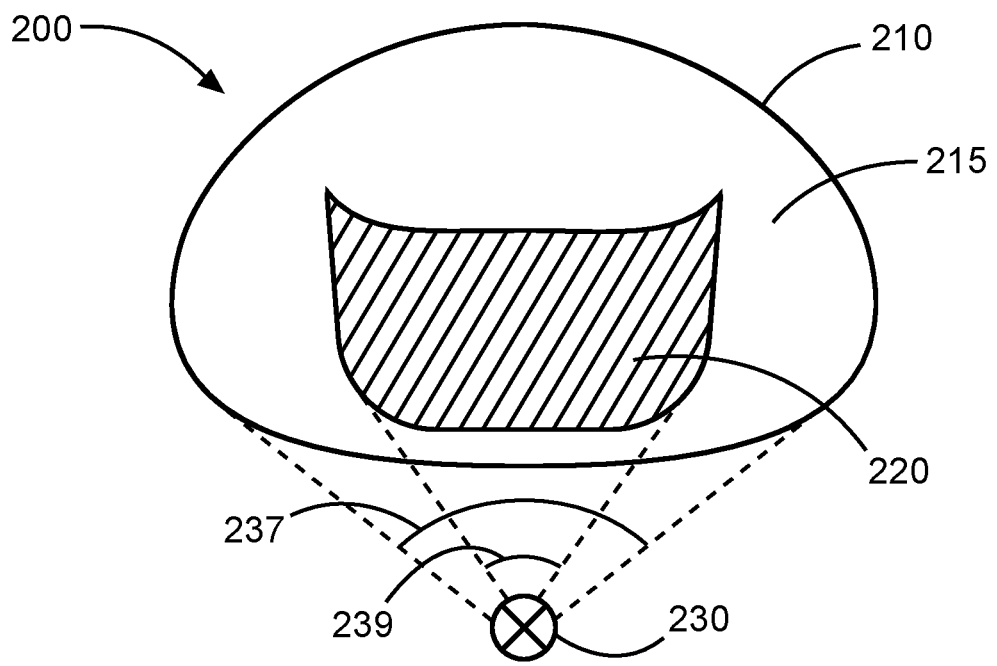
FIG. 5 is a schematic representation of a virtual video scenario with background video data and application video data.
Figure 6:
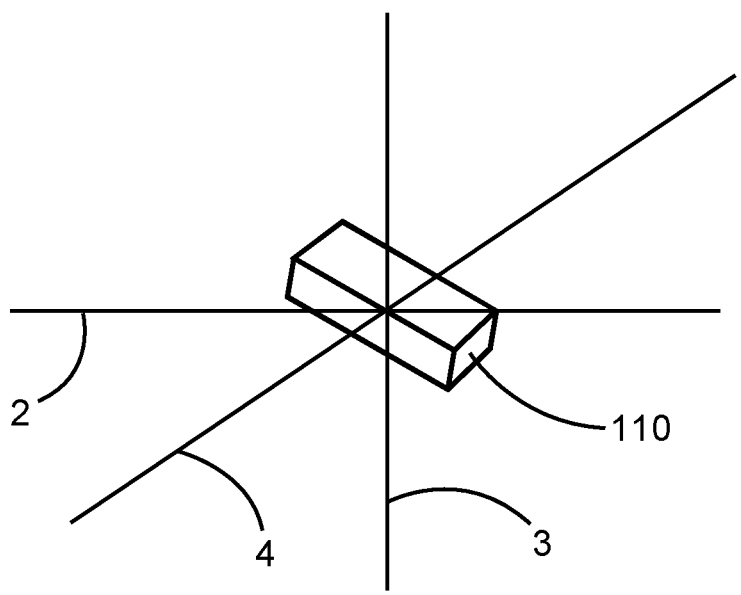
FIG. 6 is a schematic representation of a housing of a display unit that performs rotational movements about three spatial axes.

FIG. 5 shows a schematic view of the perspective of the operator from the eye-point 230. Within the field of view of the operator, the background video data 210 actually span over the entirety of the field of view with a viewing angle 237 that defines the entire field of view. The application video data 220 shown at the spherical display segment are visible in a smaller part of the field of view with a viewing angle 239. The viewing angles 237 and 239 may be solid angles. For example, the viewing angle 237 may be about 110° and the viewing angle 239 may be about 60°, when seen in a two-dimensional projection as shown in FIG. 5.

However, from the perspective of the operator's eye-point 230, the application video data 220 are surrounded by background video data 210 so that the background video data define a peripheral region 215 that surrounds the application video data. The peripheral region 215 provides the visual system of the operator with visual impressions resulting from the movement of the vehicle.

As already shown for the rotational movement of the vehicle in FIG. 3, the housing 110 of the display unit may also perform similar rotational movements in space about the roll-axis 2, and/or the yaw-axis 3, and/or the pitch-axis 4. These movements correspond to the movements of the operator's head and are used to modify the application video data 220 to change the perspective of the operator onto the application video data.

While at least one example embodiment has been presented in the foregoing detailed description, it should be appreciated that a vast number of variations exist. It should also be appreciated that the embodiment or embodiments are only examples, and are not intended to limit the scope, applicability, or configuration of the disclosure herein in any way. Rather, the foregoing detailed description will provide those skilled in the art with a convenient road map for implementing an exemplary embodiment of the disclosure herein. It will be understood that various changes may be made in the function and arrangement of elements described in an exemplary embodiment without departing from the scope of the claims.

Additionally, it is noted that "comprising" or "including" does not exclude any other elements or steps and "a" or "an" does not exclude a multitude or plurality. It is further noted that features or steps which are described with reference to one of the above exemplary embodiments may also be used in combination with other features or steps of other exemplary embodiments described above. Reference signs in the claims are not to be construed as a limitation.

LIST OF REFERENCE SIGNS 1 vehicle
2 roll axis
3 yaw axis
4 pitch axis
5 video workstation
10 display arrangement
100 display unit
110 housing
115 first sensor
120 retaining strap
150 control unit
152 first data exchange connection
154 second data exchange connection
160 second sensor
200 virtual video scenario
210 background video data
215 peripheral region
220 application video data
230 eye-point of an operator
235 radius of a sphere represented by the background video data
237 field of view
239 application data field of view

The invention claimed is:

1. A display arrangement for presenting a virtual video scenario to a human operator in a vehicle, the display arrangement comprising:
    a display unit with a housing, a first sensor, and a retaining strap, the display unit being configured to be releasably attached to a head of the human operator, and the first sensor being configured to sense first spatial movement information of the display unit;

a second sensor that is couplable to the vehicle and configured to sense second spatial movement information of the vehicle; and a control unit communicatively coupled to the display unit and configured to provide a virtual video scenario to be displayed by the display unit, and to receive the first spatial movement information;

wherein the control unit is communicatively coupled to the second sensor and configured to receive the second spatial movement information;

wherein the control unit is configured to generate the virtual video scenario based on background video data and application video data;

wherein the control unit is configured to determine a relative movement of the display unit with regard to the vehicle based on the second spatial movement information and the first spatial movement information; and wherein the control unit is configured to modify the background video data based on the second spatial movement information in a manner that the background video data perform a movement opposite to the second spatial movement, and to modify the application video data based on the second spatial movement information and the relative movement of the display unit with regard to the vehicle.

2. The display arrangement of claim 1, wherein the first sensor is configured to sense a rotational movement of the display unit about at least one spatial axis.

3. The display arrangement of claim 2, wherein the first sensor is configured to sense a rotational movement of the display unit about each of three orthogonal spatial axes.

4. The display arrangement of claim 1, wherein the second sensor is configured to sense a rotational movement of the vehicle about at least one spatial axis.

5. The display arrangement of claim 4, wherein the second sensor is configured to sense a rotational movement of the vehicle about each of three orthogonal spatial axes.

6. The display arrangement of claim 1, wherein the background video data represent a spherical artificial horizon that surrounds an eye-point of the operator at a predetermined virtual distance.

7. The display arrangement of claim 1, wherein the application video data is embedded within the background video data and overlays the background video data when observed by the operator.

8. The display arrangement of claim 7, wherein the application video data is surrounded by a peripheral region represented by background video data not overlaid by the application video data.

9. The display arrangement of claim 1, wherein the control unit is configured to determine the relative movement of the display unit with regard to the vehicle by subtracting the second spatial movement information from the first spatial movement information.

10. The display arrangement of claim 1, wherein the control unit is configured to modify the application video data based on the second spatial movement information in a manner that the application video data perform a movement with respect to the background video data in a same direction as the second spatial movement.

11. The display arrangement of claim 10, wherein the control unit is configured to modify the application video data based on the relative movement of the display unit with regard to the vehicle in a manner that the application video data are shown from a different perspective in accordance with the relative movement of the display unit with regard to the vehicle.

12. A vehicle, comprising:
a display arrangement of claim 1;
wherein the display arrangement is part of a video workstation for an operator.

13. The vehicle of claim 12, wherein the second sensor is fixedly attached to the vehicle.

14. The vehicle of claim 12, wherein the vehicle is an aircraft.

* * * * *